May 24, 1927.

H. P. SACHSE

PLATE FOR VACUUM PUMPS

Filed Aug. 12, 1925

1,629,931

Inventor:
Herman Paul Sachse
By
Gillson, Mann & Cox
Att'ys

Patented May 24, 1927.

1,629,931

UNITED STATES PATENT OFFICE.

HERMAN PAUL SACHSE, OF CHICAGO, ILLINOIS, ASSIGNOR TO CENTRAL SCIENTIFIC COMPANY, OF CHICAGO, ILLINOIS, A CORPORATION OF ILLINOIS.

PLATE FOR VACUUM PUMPS.

Application filed August 12, 1925. Serial No. 49,731.

This invention relates to vacuum pumps and particularly that portion commonly referred to as the pump plate. The principal object in view is to provide a plate that will be more durable and that can be produced more cheaply than the plates now in common use.

According to the present practice the plates are of cast iron faced with glass ground to present a smooth plane surface. Briefly, the process of making these plates includes cutting a circular disk of glass and grinding both sides of it, machining the cast piece with a cylindrical depression or seat on its upper side, applying hot jeweler's cement to the bottom and walls of the pocket, setting a number of shot in the cement and clamping the glass against the shot until the cement is set.

According to my invention the metallic base is faced with a sheet molded in place and no pocket, nor cement, nor shot, nor any grinding is required and there is less or no machining on the base.

In the drawings

Figure 2:
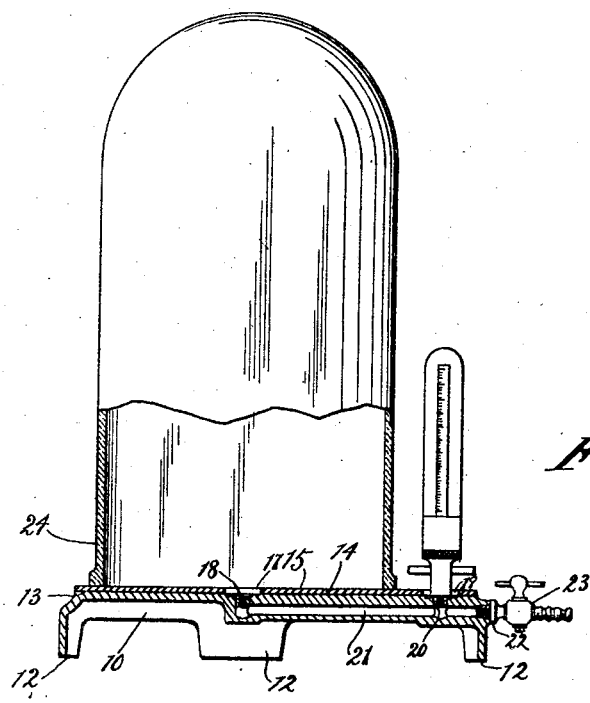
Fig. 2 is a transverse section through the center of the same.
Figure 1:
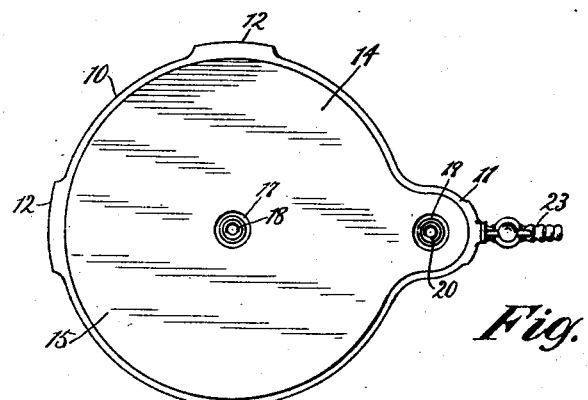
Fig. 1 illustrates a plan view of a pump plate embodying my invention.

The base 10, in conformity with the usual practice, is a casting of circular outline having a small projection 11 and supported on a plurality of legs 12. This base presents a rough plane surface 13 at its upper side on which is molded a facing sheet 14 presenting a smooth plane surface 15 and composed of a resinous binder, preferably a phenolic condensation, and a filler commonly referred to as "mud".

The surface 13 may be that presented by the casting as it comes from the mold when the rough face conforms generally to a plane surface, that is, the face of the casting is substantially straight, but the surface bears the marks of the sand mold. However, in large plates especially it will usually be of advantage to make a rough cut either on a lathe or shaper, or the like. The green resinous mixture is spread on this surface and cured under the required temperature, while the face 15 is under pressure of a suitable disk or plate presenting a finished surface.

The sheet will adhere tenaciously and strongly to the rough plane surface and the face 15 will require no grinding or finishing if the surface under which it is formed has a smooth finish. Such a facing will resist the attacks of acids, and other corroding agencies, equally as well as glass and at the same time it will withstand treatment that will destroy the glass facings formerly used.

The facing 14 is provided with a central opening 17 concentric with a threaded pocket 18 in the base. There is a similar opening 19 and pocket 20 in the projection 11. A passage 21 connects the two pockets and extends to the remote edge 22 of the projection where it is threaded to receive any desired fitting, such as a hose cock 23. The pockets 18 and openings 17 are to receive gages, cocks, or other devices, as will be readily understood. The lower portion of a bell jar is indicated at 24 resting upon the upper surface of the bakelite facing 14.

Figure 3:
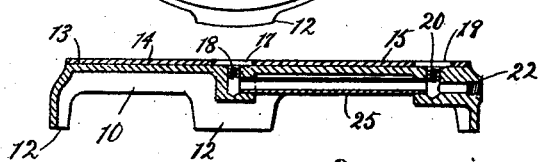
Fig. 3 is a similiar section illustrating a modified form of base.

Fig. 3 shows a slightly modified base in which the gas passage is formed by casting a piece of steel tubing 25 in the metal of the base. This produces a cheaper plate than when the passage is drilled, as illustrated in Fig. 2.

Use has been made of specific description and illustration in order to disclose the invention, but it is intended that nothing contained herein shall unnecessarily limit the following claims, or require a construction thereof that would permit the substance of the invention to be used without infringement.

I claim as my invention:

1. A plate for vacuum pumps comprising a metallic base provided with a rough plane surface and a facing adapted to receive a bell jar secured to said surface, the securing bond being characterized by having been formed by a molding operation under conditions of heat and pressure.

2. A plate for vacuum pumps comprising a metallic base provided with a rough plane surface and a facing adapted to receive a bell jar secured to said surface, the securing bond being characterized by having been formed by a molding operation under conditions of heat and pressure, and said facing presenting a finished surface (to receive the bell jar) as the result of such molding operation.

In testimony whereof I affix my signature.

HERMAN PAUL SACHSE.